Patented Apr. 24, 1951

2,550,206

UNITED STATES PATENT OFFICE 2,550,206

PROCESS FOR THE MANUFACTURE OF RUBBER ARTICLES

Rebecca O. Teston, Glenbrook, Conn., assignor to Eastern Rubber Specialties, South Norwalk, Conn., a corporation of Connecticut No Drawing. Application November 18, 1947, Serial No. 786,799

2 Claims. (Cl. 18—58.6)

1

This invention relates to the manufacture of rubber articles from dispersions of latex. More particularly, this invention relates to the manufacture of rubber articles through the coagulation of latex upon a form or mold as set forth in such patents as that to Teague, No. 1,719,633, issued July 2, 1929; Newton, No. 1,924,214, issued August 29, 1933; and my earlier application, Ser. No. 721,448, filed January 10, 1947, now Patent No. 2,482,075, for a "Process for the Manufacture of Rubber Articles."

In the practice of this art it is customary to use a mold formed in the desired shape of the finished article, this mold being adapted for coating with a liquid latex or rubber that is suitably coagulated thereon. After coagulation, the coating is vulcanized and then stripped from the mold. The coagulation of the coating on the mold may be accomplished in several ways; thus, the Teague patent teaches that the form may be coated first with a dispersion of latex and thereafter subjected to the action of a coagulant, the form to be redipped into a dispersion of latex after treatment of the first coat by the coagulant. There may follow thereafter further dippings into coagulant and latex until a latex coating of a desired thickness is obtained.

As is pointed out in my earlier application, because the latex is applied directly to the form, the finished vulcanized product cannot be stripped from the form except with extreme difficulty, so that much time and effort is expended in removing finished articles from the forms, with the articles frequently being damaged in the process. It was found by other workers in the art that the first coat of latex suggested by Teague may be omitted, and the coagulant applied directly to the form. Thereafter, the form coated with the coagulant may be dipped into a dispersion of latex and the latex coagulated on the form and then dried. While this process is apparently commercially successful, the resulting product is still difficult to strip from the mold. Moreover, a relatively rough product results because of the tendency for air and other vapors to become entrapped between the mold and the coagulant.

In order to eliminate entrapped air bubbles and vapors, Newton suggested the use of a vapor pervious layer between the form and the first coating applied thereto, whereby to allow the escape of the entrapped vapors. I have found, however, that while the Newton process may avoid the development of vapors to a considerable extent, air bubbles will collect about the

2 vapor pervious material suggested by Newton, and during the vulcanization process these bubbles of vapor are enlarged and do injure the product.

In my application to which I have referred above, I disclose a very important contribution to the art residing in the utilization of a lubricant in advance of the first coating applied to the mold, the preferred first coating in my patent application being latex rather than a coagulant. The preferred lubricant that I use is a paraffin emulsion, although I do disclose also the use of a microcrystalline wax sold under the trademark Ceramul M, and various other mediums through which my invention may be practiced. Through the use of the particular emulsions, I apply to the mold a gas impervious material that will adhere closely to the mold and will prevent the formation of air and gas bubbles. Thus, the lubricants used are of such character that not only will the lubricants adhere closely to the mold without air or gas bubbles being trapped, but the first coating of latex will also adhere extremely closely to the lubricant, and without the formation of gas or air pockets therebetween. Because of this relationship of the coatings, upon vulcanization there is no enlargement of air or gas bubbles, and the completed product is of extremely high quality. Moreover, it is extremely easy to strip the finished product from the mold through a natural sliding movement of the product from the mold, it being interesting to note that while the product will thus slide from the mold, it is extremely difficult to pull the product away from the mold transversely, because of the very close adherence of the latex to the lubricant and the further close adherence of the lubricant to the mold.

In the practice of the invention set forth in my earlier application, I found it most desirable to dip the lubricant coated form into a dispersion of latex, and thereafter into a coagulant, in order to build up a latex coating on the mold. As a matter of fact, it was not found desirable to utilize a coagulant dip followed by a latex dip, since the coagulant when applied to the paraffin and wax lubricants suggested by me, failed to adhere uniformly to the lubricant coated form because of the nature of the lubricant film. As suggested by Newton, a coagulant will not coat uniformly a greasy form. By using wetting agents in large quantities, I found it possible to apply the coagulant to the lubricant, but the wetting agents prove detrimental to the latex film subsequently applied. Thus, wetting agents such as Aquarex D leave a residue that is deleterious to the carrying out of the process. For the several reasons thus set forth, I found it desirable as already outlined, to utilize a latex dip following the coating of the form with a lubricant, the latex dip then being coagulated by a coagulant dip, and a further latex dip following thereafter. All this is fully set forth in my earlier application.

The invention of this application resides in the conception of the utilization of a hard wax for the lubricant coating, and the application directly thereto of the coagulant. For my wax I use a carnauba wax, sold by such firms as Johnson & Co. under the designation "Industrial Wax." This carnauba wax contributes a hard, non-greasy finish to which, I have found, a coagulant such as an aqueous solution of 33.3% calcium nitrate will adhere uniformly and smoothly. Moreover, the coagulant will adhere so closely to the carnauba wax coating on the form, that no air bubbles can exist between the two. Still further, the wax will itself be applied so closely to the form that no air bubbles will be present between the wax and the form. Therefore, upon the dipping of the form into the latex bath following the coating thereof with a coagulant, there will be deposited on the form a coating which, when vulcanized, will be uniform and smooth since there are no air bubbles present to escape or to be expanded. Still further, the finished product can be stripped readily from the mold by simple easy sliding on the waxed surface of the mold.

It appears therefore, that through the utilization of a hard gas impervious carnauba wax finish applied directly to a form, it is possible to use a coagulant dip followed by a latex dip, with the resulting dips yielding a fine product that will be free of those defects that Newton sought to eliminate in his patent supra through the use of a gas pervious coating. Moreover, the resulting product made on my forms will strip readily from the forms through a smooth sliding action, whereby to eliminate the frequently damaged product that results from the rather more difficult stripping of products made under processes earlier taught by this art.

In carrying out my invention, I utilize an inexpensive mold or form which may be of glass, metal, ceramics, plastics, etc., all as those skilled in the art will appreciate. This mold will first be coated with a carnauba wax emulsion that may be Johnson's "Industrial Wax." This wax may be applied by spraying or by dipping, and is then air dried. Thereafter, the forms may be dipped into an aqueous solution of calcium nitrate coagulant. For the purpose I prefer a 33.3% aqueous solution of calcium nitrate which may contain a very small quantity of a suitable wetting agent such as Tween 20. Actually, I use approximately ½% of 1% of this wetting agent. The coagulant dip may now be followed by a latex dip, and if desired, there may follow further coagulant and latex dips. The resulting latex coated forms are then dried in hot air ovens and stripped, the forms stripping smoothly and well, and yielding a very high grade product as has earlier been full emphasized.

I now claim:

1. The process of forming hollow rubber articles that comprises dipping a mold in a carnauba wax emulsion to form a gas impervious layer on said mold, applying a coagulant to the wax coated form, subjecting the form to contact with a dispersion of latex to build up the thickness of the rubber coating on the form, drying the said rubber coating, and then sliding the said rubber coating off the wax coated mold.

2. The process of forming hollow rubber articles that comprises coating a mold first with a hard finish carnauba wax gas impervious film, applying a coagulant directly to the wax coated form without substantial dilution with a wetting agent, subjecting the mold to contact with a dispersion of latex to build up the thickness of the rubber coating, drying the said rubber coating, and then sliding the said rubber coating off the wax coated mold.

REBECCA O. TESTON.

REFERENCES CITED

The following references are of record in the file of this patent:

UNITED STATES PATENTS

| Number | Name | Date |
|---|---|---|
| 1,924,214 | Newton | Aug. 29, 1933 |
| 1,996,079 | Murphy | Apr. 2, 1935 |
| 2,007,392 | Dreyfus | July 9, 1935 |
| 2,482,075 | Teston | Sept. 13, 1949 |